United States Patent
Ueda et al.

(10) Patent No.: US 9,783,058 B2
(45) Date of Patent: Oct. 10, 2017

(54) POWER SUPPLY SYSTEM (71) Applicants: TOYOTA JIDOSHA KABUSHIKI KAISHA, Toyota-shi, Aichi-ken (JP); TOYOTA TURBINE AND SYSTEMS INC., Toyota, Aichi Prefecture (JP)

(72) Inventors: Shingo Ueda, Toyota (JP); Tomoyuki Mizuno, Okazaki (JP)

(73) Assignees: TOYOTA JIDOSHA KABUSHIKI KAISHA, Toyota (JP); TOYOTA TURBINE AND SYSTEMS INC., Toyota (JP)

( * ) Notice: Subject to any disclaimer, the term of this patent is extended or adjusted under 35 U.S.C. 154(b) by 0 days.

(21) Appl. No.: 15/024,280

(22) PCT Filed: Sep. 22, 2014

(86) PCT No.: PCT/IB2014/001891
§ 371 (c)(1),
(2) Date: Mar. 23, 2016

(87) PCT Pub. No.: WO2015/044740
PCT Pub. Date: Apr. 2, 2015

(65) Prior Publication Data
US 2016/0207402 A1  Jul. 21, 2016

(30) Foreign Application Priority Data
Sep. 24, 2013 (JP) ................................ 2013-196742

(51) Int. Cl.
*B60L 1/00* (2006.01)
*B60L 11/18* (2006.01)
(Continued)

(52) U.S. Cl.
CPC .............. *B60L 1/006* (2013.01); *B60K 6/445* (2013.01); *B60L 11/1803* (2013.01);
(Continued)

(58) Field of Classification Search
CPC .... B60L 1/006; B60L 11/1803; B60L 15/025; Y02T 10/6239; B60W 10/08; B60W 20/00
(Continued)

(56) References Cited

U.S. PATENT DOCUMENTS 7,443,116 B2 * 10/2008 Kutsuna .............. B60L 11/1803
180/65.1
7,587,263 B2 * 9/2009 Matsuda .................. B60K 6/44
318/139
(Continued)

FOREIGN PATENT DOCUMENTS

JP  2006-121844 A  5/2006
JP  2009-118659 A  5/2009

*Primary Examiner* — Rita Leykin
(74) *Attorney, Agent, or Firm* — Oliff PLC (57) ABSTRACT

A power supply system includes a first controller that controls an MG1 inverter, a second controller that controls an MG2 inverter, and a voltage sensor that detects a voltage generated from a pair of output terminals. The first controller controls the MG1 inverter according to a target value of the voltage generated from the output terminals, irrespective of the magnitude of a deviation between the target value of the voltage generated from the output terminals, and the detected voltage. The second controller controls the MG2 inverter according to the deviation. This processing is implemented by an effective value computing unit, effective value PI control unit, and a neutral point output voltage command unit.

3 Claims, 4 Drawing Sheets (51) Int. Cl.
*B60L 15/02* (2006.01)
*B60K 6/445* (2007.10)
*B60W 10/08* (2006.01)
*B60W 20/00* (2016.01)
*H02P 5/747* (2006.01)

(52) U.S. Cl.
CPC ............ *B60L 15/025* (2013.01); *B60W 10/08* (2013.01); *B60W 20/00* (2013.01); *H02P 5/747* (2013.01); *Y02T 10/6239* (2013.01); *Y02T 10/643* (2013.01); *Y02T 10/7005* (2013.01)

(58) Field of Classification Search
USPC .................................................. 318/139, 149
See application file for complete search history.

(56) References Cited

U.S. PATENT DOCUMENTS

| | | | | |
|---|---|---|---|---|
| 7,594,491 B2* | 9/2009 | Yanagida | ................ | F02N 11/04 123/179.28 |
| 7,701,156 B2* | 4/2010 | Okamura | ................ | B60K 6/365 180/65.265 |
| 7,859,201 B2* | 12/2010 | Oyobe | ................ | B60K 6/445 318/105 |
| 8,340,848 B2* | 12/2012 | Son | ................ | H02P 21/13 318/400.04 |
| 8,359,131 B2* | 1/2013 | Gallegos-Lopez | ..... | B60L 11/14 701/22 |
| 8,618,767 B2* | 12/2013 | Ishii | ................ | B60L 3/0069 320/104 |
| 8,818,600 B2* | 8/2014 | Reed | ................ | B60W 10/02 180/65.265 |
| 8,860,348 B2* | 10/2014 | Savagian | ................ | B60L 7/14 318/111 |
| 8,872,473 B2* | 10/2014 | Song | ................ | B60L 7/14 320/109 |
| 8,882,634 B2* | 11/2014 | Banker | ................ | B60W 10/196 477/5 |
| 8,901,882 B2* | 12/2014 | Song | ................ | B60L 11/1814 320/109 |
| 8,932,179 B2* | 1/2015 | Banker | ................ | B60W 10/184 477/185 |
| 8,937,455 B2* | 1/2015 | Mitsutani | ................ | B60K 6/445 320/109 |
| 9,068,546 B2* | 6/2015 | Gibson | ................ | F02N 11/006 |
| 9,199,651 B2* | 12/2015 | Wada | ................ | B60K 6/46 |
| 9,366,012 B2* | 6/2016 | Moriki | ................ | E02F 9/2075 |
| 2009/0115375 A1* | 5/2009 | Iida | ................ | B60L 11/123 320/138 |
| 2009/0121659 A1* | 5/2009 | Oyobe | ................ | B60K 6/445 318/12 |
| 2009/0159348 A1* | 6/2009 | Oyobe | ................ | B60L 11/123 180/65.21 |
| 2009/0251000 A1* | 10/2009 | Su | ................ | B60L 11/1887 307/9.1 |
| 2010/0027305 A1* | 2/2010 | Oyobe | ................ | B60L 3/0061 363/131 |
| 2010/0262308 A1* | 10/2010 | Anderson | ................ | B60G 13/14 700/287 |
| 2010/0299008 A1* | 11/2010 | Mitsutani | ................ | B60K 6/445 701/22 |
| 2010/0314183 A1* | 12/2010 | Olsen | ................ | B60K 1/04 180/65.1 |
| 2011/0041723 A1* | 2/2011 | Kumar | ................ | B60L 9/16 105/35 |
| 2011/0251746 A1* | 10/2011 | Wu | ................ | B60K 6/48 701/22 |
| 2011/0288711 A1* | 11/2011 | Yanagisawa | ................ | B60W 10/26 701/22 |
| 2012/0130576 A1* | 5/2012 | Sugiyama | ................ | B60K 6/12 701/22 |
| 2013/0030630 A1* | 1/2013 | Luke | ................ | E05B 81/56 701/22 |
| 2013/0090795 A1* | 4/2013 | Luke | ................ | B60L 11/005 701/22 |
| 2013/0173105 A1* | 7/2013 | Kojima | ................ | B60L 11/1864 701/22 |
| 2013/0271077 A1* | 10/2013 | Kim | ................ | B60L 11/1811 320/109 |
| 2015/0167615 A1* | 6/2015 | Komuro | ................ | F02N 11/0851 290/31 |

\* cited by examiner

POWER SUPPLY SYSTEM

BACKGROUND OF THE INVENTION

1. Field of the Invention

The invention relates to a power supply system, and in particular to a power supply system including two or more inverters.

2. Description of Related Art

A power supply system that supplies electric power from a vehicle equipped with an electric storage device, to an external load, or the like, has been put to practical use. The power supply system has been developed for the purposes of power supply for emergency at the time of disaster, and mitigation of a peak of electric power consumption by commercial power sources, for example.

An AC power supply system disclosed in Japanese Patent Application Publication No. 2006-121844 (JP 2006-121844 A) includes a DC power supply, first motor-generator and second motor-generator, first inverter and second inverter supplied with electric power from the DC power supply and connected to the first motor-generator and the second motor-generator, respectively, and an controller that controls the first inverter and the second inverter.

In the AC power supply system, the controller drives the first motor-generator and the second motor-generator, and further controls the operations of the first inverter and the second inverter, so that an AC voltage is developed between neutral points of the first motor-generator and the second motor-generator when electric power is supplied from the vehicle to an external load, or the like.

SUMMARY OF THE INVENTION

In the system of JP 2006-121844 A as identified above, the voltage of the power supplied is controlled using the first inverter and the second inverter that drive the first motor-generator and the second motor-generator, respectively. However, when the amount of electric power consumed by the load suddenly changes, for example, the control operations of the two inverters may interfere with each other, and the voltage of the power supplied may not be stabilized.

This invention provides a power supply system that produces output voltage with improved stability.

A power supply system according to one aspect of the invention includes a first inverter, a first motor-generator driven by the first inverter, a second inverter, and a second motor-generator driven by the second inverter. The power supply system includes a pair of output terminals including a first terminal connected to a neutral point of stator coils of the first motor-generator, and a second terminal connected to a neutral point of stator coils of the second motor-generator. The power supply system includes a voltage detector that detects a voltage generated from the pair of output terminals, a first controller configured to control the first inverter according to a target value of the voltage generated from the output terminals, irrespective of a magnitude of a deviation between the target value of the voltage generated from the output terminals, and the voltage detected by the voltage detector, and a second controller configured to control the second inverter according to the deviation.

According to the above aspect of the invention, the output voltage is controlled with stability, even when electric power consumption at a load suddenly changes, for example.

In the power supply system according to the above aspect of the invention, the power supply system may be installed on a vehicle, and the vehicle may have drive wheels, and an internal combustion engine. The first motor-generator may be operable to receive mechanical power of the internal combustion engine and generate electric power, and the second motor-generator may be operable to drive the drive wheels. The first controller may execute dead time compensation control of the first inverter, when the first motor-generator generates electric power while electric power is supplied from the pair of output terminals to a load.

In the power supply system as described above, each of the first controller and the second controller may include a computer having substantially the same performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
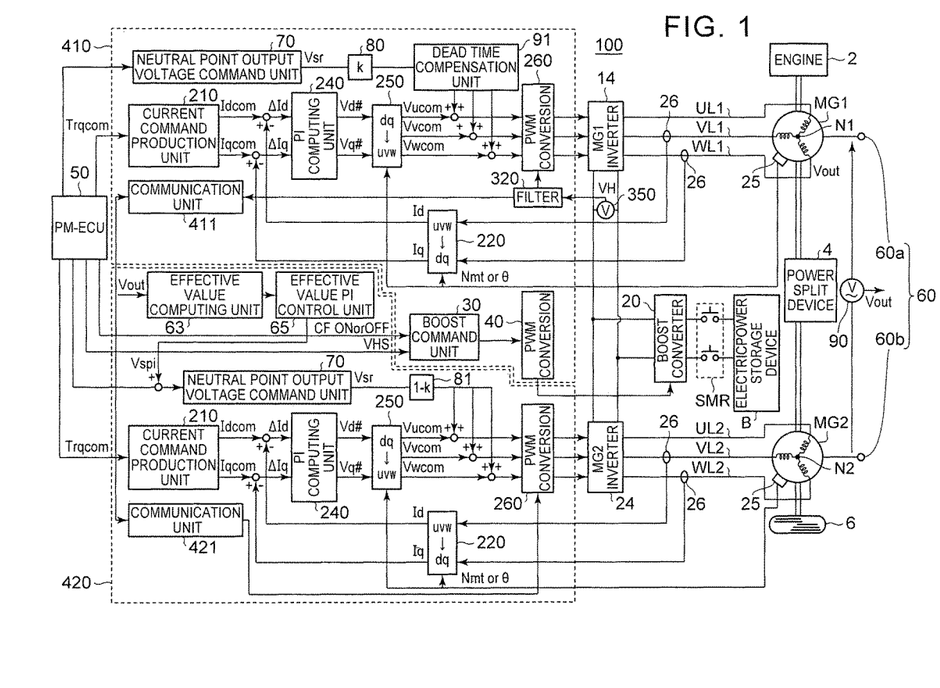
FIG. 1 is a block diagram illustrating the configuration of a power supply system according to one embodiment, of the invention.

One embodiment of the invention will be described in detail with reference to the drawings. In the drawings, the same reference numerals are assigned to the same or corresponding portions or elements, which will not be repeatedly described. FIG. 1 is a block diagram illustrating the configuration of a power supply system according to one embodiment of the invention. In the following, the case where the vehicle on which the power supply system is installed is a hybrid vehicle will be described. However, the vehicle of this invention is not limited to the hybrid vehicle.

Referring to FIG. 1, the vehicle 100 is a hybrid vehicle that runs using an engine 2 and a motor-generator MG2 as power sources. The driving force generated by the engine 2 and the motor-generator MG2 is transmitted to drive wheels 6.

The engine 2 is an internal combustion engine, such as a gasoline engine or a diesel engine, which generates power by burning fuel. The engine 2 is configured such that its operating conditions, such as the throttle opening (intake air amount), fuel supply amount, and the ignition timing, can be electrically controlled according to signals from a power management electronic control unit (PM-ECU) 50.

A motor-generator MG1 is used as a generator driven by the engine 2. The motor-generator MG1 is also used as a rotating electric machine capable of starting the engine 2 by cranking. Also, electric power generated by the motor-generator MG1 when it is rotated by the engine 2 can be used for driving the motor-generator MG2.

The motor-generator MG2 is mainly used as a rotating electric machine for driving the drive wheels 6 of the vehicle 100. The motor-generators MG1, MG2 are AC rotating electric machines, which are, for example, three-phase AC synchronous motors.

The motor-generators MG1, MG2 are also operable to generate electric power through neutral-point power generation, using a voltage difference between neutral points N1, N2 of the motor-generators MG1, MG2. The vehicle 100 can supply the electric power obtained in this manner, from a pair of output terminals 60a, 60b of an output unit 60 to an external load (not shown), via the neutral points N1, N2.

In this specification, supplying electric power from the vehicle 100 to the outside, in the case where the electric power is discharged from an electric storage device B as well as the case where the electric power is generated by rotating a generator(s), will be called "power generation". Then, voltage Vout generated from the output unit 60 will be called "generated voltage".

A power split device 4 includes a planetary gear mechanism having three rotational shafts (not shown), i.e., a sun gear, a carrier, and a ring gear, for example. The sun gear is coupled to a rotary shaft of the motor-generator MG1. The carrier is coupled to the crankshaft of the engine 2. The ring gear is coupled to a drive shaft. The power split device 4 splits driving force of the engine 2, and transmits the driving force as power to the rotary shaft of the motor-generator MG1 and the drive shaft. The drive shaft is coupled to the drive wheels 6. The drive shaft is also coupled to a rotary shaft of the motor-generator MG2.

The electric storage device B is installed on the vehicle 100. The electric storage device B is mainly constituted by a lithium-ion secondary battery. The electric storage device B and a boost converter 20 are electrically connected to or disconnected from each other via a system main relay SMR. The electric storage device B may be a nickel-metal-hydride battery or a capacitor.

The boost converter 20 is a voltage converter. The boost converter 20 raises the voltage of the electric storage device B and generates, the resulting voltage. In this specification, the output voltage of the boost converter 20 will be called "voltage VH". The boost converter 20 is operable under PWM control. To perform the PWM control, a boost command unit 30 sends a PWM control signal to the boost converter 20 via a PWM conversion unit 40. The boost command unit 30 is controlled by the PM-ECU 50.

The voltage VH is smoothened by a smoothing capacitor (not shown), and is supplied to an MG1 inverter 14 and an MG2 inverter 24. The smoothing of the voltage is effected by removing a high-frequency component and noise produced in the boost converter 20, for example. The MG1 inverter 14 is mainly controlled by a 1MG_CPU 410. The MG2 inverter 24 is mainly controlled by a 2MG_CPU 420. Here, rotary drive control of the MG1 inverter 14 will be explained. The MG2 inverter 24 and its control are substantially identical with the MG1 inverter 14 and its control; therefore, the same reference numerals are assigned to corresponding units, of which explanation will not be repeated.

The MG1 inverter 14 is, for example, a PWM inverter in which switching devices are driven under sinusoidal PWM control. Other than this type of inverter, any of the sinusoidal PWM control method, overmodulation PWM control method, and rectangular voltage control may be used, or these methods may be switched from one to another, depending on operating conditions (typically, torque and rotational speed) of the motor-generator MG1.

A current command production unit 210 provides a basis (current reference waveform) of current waveform generated from the MG1 inverter 14. More specifically, the current command production unit 210 produces a d-axis current command value Idcom and a q-axis current command value Iqcom on d-q axes, responsive to a torque command value Trqcom of the PM-ECU 50, according to a table prepared in advance, for example.

A PI computing unit 240 is used for proportional integral (PI) computation. The PI computing unit 240 outputs a d-axis voltage command value Vd# corresponding to deviations between. Id as feedback signal and the d-axis current command value Idcom (control deviation ΔId), to a coordinate conversion unit 250. The PI computing unit 240 also outputs a q-axis voltage command value Vq# corresponding to deviations between Iq as feedback signal and q-axis current command value Iqcom (control deviation ΔIq), to a coordinate conversion unit 250.

The coordinate conversion unit 250 converts the d-axis voltage command value Vd# and the q-axis voltage command value Vq# to voltage command values Vucom, Vvcom, Vwcom of the U phase, V phase and W phase, respectively, based on the rotor position θ or rotational speed Nmt of the motor-generator MG1 transmitted from a resolver 25 which will be described later (coordinate conversion from two phases to three phases). The coordinate conversion unit 250 then outputs the voltage command values Vucom, Vvcom, Vwcom to a PWM signal production unit 260.

The PWM signal production unit 260 produces PWM signals, based on the voltage command values Vucom, Vvcom, Vwcom, and outputs the PWM signals to the MG1 inverter 14. More specifically, the PWM signal production unit 260 produces switching control signals, based on comparison of the voltage command values Vucom, Vvcom, Vwcom of the respective phases with a given carrier wave (carrier signal), and outputs the signals to the MG1 inverter 14.

The MG1 inverter 14 performs PWM control based on the PWM signals from the PWM signal production unit 260. Thus, the MG1 inverter 14 converts electric power from the boost converter 20, to voltage and current having desired waveforms, and generates the resulting power. The MG1 inverter 14 is connected to coils of the respective phases of the motor-generator MG1, via U-phase line UL1, V-phase line VL1, W-phase line WL1, respectively. Therefore, the output of the MG1 inverter 14 is supplied to the motor-generator MG1 so as to drive the motor-generator MG1. In this manner, the motor-generator MG1 is driven at a desired rotational speed, according to the torque command value Trqcom received by the current command production unit 210.

The motor-generator MG1 is provided with the resolver 25 for estimating the rotor position. The resolver 25 is connected to the coordinate conversion units 220 and 250.

The motor-generator MG1 is also provided with current sensors 26 for measuring current that flows through the motor-generator MG1. The current sensors 26 are connected to the coordinate conversion unit 220. The coordinate conversion unit 220 converts the current flowing through the motor-generator MG1, to the d-axis current Id and the q-axis current Iq, based on the rotor position θ or rotational speed Nmt of the motor-generator MG1. The d-axis current Id and q-axis current Iq thus obtained by conversion are used for computing the control deviations ΔId and ΔIq received by the PI computing unit 240.

The MG2 inverter 24 is connected, via U-phase line UL2, V-phase line VL2, W-phase line WL2, to coils of respective phases of the motor-generator MG2. Other than this arrangement, the MG2 inverter 24 and its control are substantially identical with the MG1 inverter and its control, and therefore, the same reference numerals are assigned to corresponding portions or units, of which explanation will not be repeated. The vehicle 100 shown in FIG. 1 can perform so-called neutral-point power generation. Namely, the neutral-point power generation means causing a potential difference to arise between the neutral point N1 and the neutral point N2, and supplying electric power to a load connected between the neutral point N1 and the neutral point N2.

The MG1 inverter 14 is provided with switching devices corresponding to the U phase, V phase and W phase, such that the switching devices for the respective phases can be individually controlled. During the neutral-point power generation, these switching devices are appropriately controlled so that an electric potential appears at the neutral point N1.

Like the MG1 inverter 14, the MG2 inverter 24 is also provided with switching devices corresponding to the U phase, V phase and W phase, such that the switching devices for the respective phases can be individually controlled. During the neutral-point power generation, these switching devices are appropriately controlled so that an electric potential also appears at the neutral point N2.

When the potential of the neutral point N1 is different from the potential of the neutral point N2, the above-mentioned generated voltage Vout is developed between the neutral point N1 and the neutral point N2. The generated voltage Vout is supplied to a load (not shown) outside the vehicle 100, via the pair of output terminals 60a, 60b of the output unit 60. When the MG1 inverter 14 and the MG2 inverter 24 are appropriately controlled, a desired generated voltage Vout is obtained.

During the neutral-point power generation, the PWM signal production unit 260 in the 1MG_CPU 410 produces the PWM signals, based on a command (voltage reference waveform) Vsr from a neutral point output voltage command unit 70 and a voltage distribution ratio k (reference numeral 80), and the carrier signal. At this time, the carrier signal needs to be changed according to the input voltage of the MG1 inverter 14 and the MG2 inverter 24, namely, the voltage VH. The PWM signal production unit 260 in the 2MG_CPU 420 produces the PWM signals, based on a command (voltage reference waveform) Vsr from the neutral point output voltage command unit 70 and a voltage distribution ratio 1-k (reference numeral 81), and the carrier signal.

A VH voltage sensor 350 for measuring the voltage VH is provided between the boost converter 20 and the MG1 inverter 14. Measurement values (voltage VH values) of the VH voltage sensor 350 are transmitted to a filter 320. The filter 320 averages the measurement values of the VH voltage sensor 350. The average voltage VH value is then transmitted to the PWM signal production unit 260 on the motor-generator MG1 side. In this manner, the 1MG_CPU 410 causes the voltage VH value to be reflected by the PWM control of the MG1 inverter 14.

In the meantime, the filter 320 also sends the voltage VH value to a communication unit 411. The communication unit 411 is included in the 1MG_CPU 410, and is used for allowing the 1MG_CPU 410 to communicate with the 2MG_CPU 420. The communication unit 411 sends the voltage VH value to a communication unit 421 included in the 2MG_CPU 420. In this manner, the 2MG_CPU 420 causes the voltage VH value to be reflected by the PWM control of the MG2 inverter 24.

While the 1MG_CPU 410 includes a dead time compensation unit 91, the 2MG_CPU 420 does not include the dead time compensation unit 91. When the neutral-point power generation is performed, the motor-generator MG1 may be operated as a generator, using power of the engine 2, and deliver electric power thus generated from the output unit 60, so as not to reduce the state of charge (SOC) of the electric storage device B. At this time, if the dead time of the MG1 inverter 14 is not compensated for, the quality of the output electric power may deteriorate, for example, the power waveform may be distorted. On the other hand, the motor-generator MG2 is mainly used for running the vehicle, and the passenger is less likely or unlikely to feel uncomfortable during running even if the dead time is not compensated for. With the dead time compensation unit 91 thus provided in the 1MG_CPU 310 for the above reason, the amount of computations performed by the 1MG_CPU 410 is larger, by an amount due to provision of the dead time compensation unit 91, than that of the 2MG_CPU 420, and the CPU load of the 1MG_CPU 410 is increased.

Figure 2:
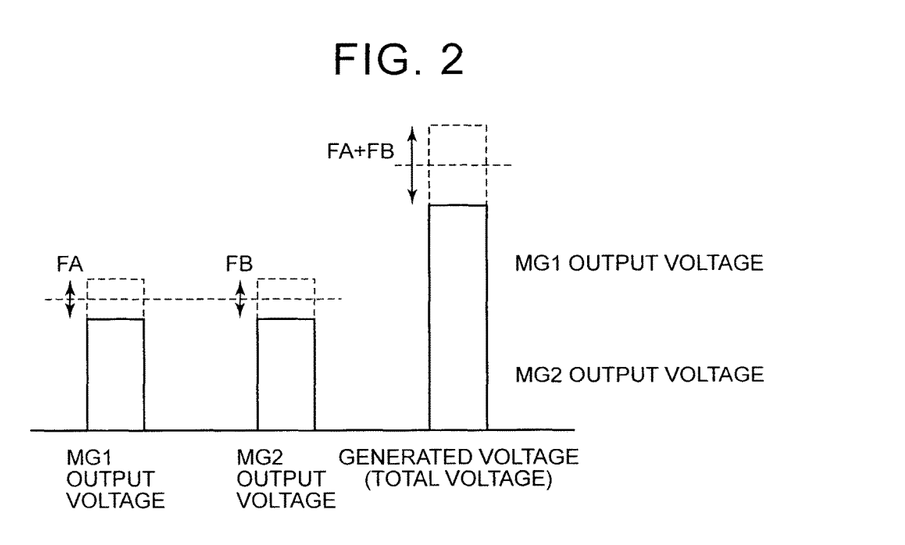
FIG. 2 is a schematic view useful for explaining voltage fluctuations in a comparative example in which voltage feedback control is performed in inverters of two motor-generators.

FIG. 2 is a schematic view useful for explaining voltage fluctuations in a comparative example in which voltage feedback control is performed in inverters of two motor-generators. The power supply system shown in FIG. 1 generates AC power, by utilizing the in-vehicle inverters (14, 24) and motors (MG1, MG2) for running the vehicle. However, the power supply system needs to keep the quality of electric power equal to or higher than a given level, so that a load, such as an electric appliance, can be normally operated with the AC power thus generated. The quality of electric power indicates how much the voltage value and frequency of the power waveform (sine wave) of the supplied electric power deviate from reference values, and is generally represented by parameters, such as voltage regulation and voltage distortion rate In the method of using the in-vehicle inverters for driving the motors, for supplying electric power to the outside, if the control fails, the quality of electric power is not stabilized, and the load, such as an electric appliance, may not operate, depending on the type of the load. Accordingly, the power supply system needs to control the inverters so as to stabilize the quality of electric power.

Referring to FIG. 2, "MG1 OUTPUT VOLTAGE" denoted in FIG. 2 represents voltage generated from the neutral point N1 of FIG. 1. Also, "MG2 OUTPUT VOLTAGE" denoted in FIG. 2 represents voltage generated from the neutral point N2 of FIG. 1. Also, "GENERATED VOLTAGE (TOTAL VOLTAGE)" denoted in FIG. 2 represents voltage generated from the output unit 60 of FIG. 1, and is equal to the sum of the "MG1 OUTPUT VOLTAGE" and the "MG2 OUTPUT VOLTAGE".

For example, it is considered to detect an effective value of the generated voltage in the power generation control, for use in feedback control, so as to compensate the generated voltage value. The case where the feedback control is applied to both of inverter controls of two motor-generators, when the two motor-generators MG1, MG2 as shown in FIG. 1 are used, will be considered.

If voltage fluctuations FA due to feedback control occur to the "MG1 OUTPUT VOLTAGE", and voltage fluctuations FB due to feedback control occur to the "MG2 OUTPUT VOLTAGE", as shown in FIG. 2, the range of fluctuations that occur to the "GENERATED VOLTAGE" becomes equal to FA+FB. It is recognized by evaluation that, if each of the two inverters operates by itself, the operations of these inverters interfere with each other, and the generated voltage undergoes hunting and is not stabilized.

Figure 3:
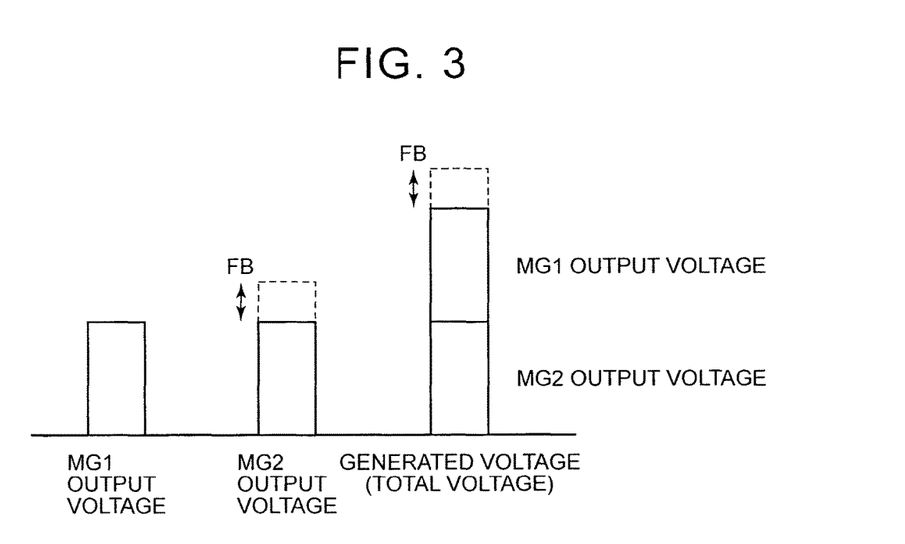
FIG. 3 is a schematic view useful for explaining voltage fluctuations in the power supply system of this embodiment.

FIG. 3 is a schematic view useful for explaining voltage fluctuations of the power supply system of this embodiment. Referring to FIG. 3, in this embodiment, the feedback control is applied to only one of the inverter controls of the two motor-generators. The above-indicated one of the inverter controls may be performed on the MG1 inverter 14 or the MG2 inverter 24. In this embodiment, the feedback control is not performed on the MG1 inverter 14, but performed only on the MG2 inverter 24.

As shown in FIG. 3, no voltage fluctuations due to feedback control occur to the "MG1 OUTPUT VOLTAGE", and voltage fluctuations FB due to feedback control occur to the "MG2 OUTPUT VOLTAGE". In this case, the range of fluctuations that occur to the "GENERATED VOLTAGE" is equal to FB. As compared with FIG. 2, the range of fluctuations is reduced by an amount corresponding to the voltage fluctuations. FA. Also, since the two feedback controls do not interfere with each other, no hunting phenomena take place.

In the processing executed by an effective value PI control unit 65 of FIG. 1, the following equations are satisfied where V is target voltage, k is distribution rate of the generated voltage MG1, and ΔV is voltage deviation.

$$\Delta V = V - V\text{out}$$

$$\text{Control Voltage}(MG1) + \text{Control Voltage}(MG2) = V \times k + (V + \Delta V) \times (1 - k)$$

The summary of the control will be briefly explained.

Initially, a target value V (e.g., AC 100V) of the generated voltage is entered by the user, into the 1MG_CPU 410 and 2MG_CPU 420, via the PM-ECU 50. The generated voltage target value V is converted to instantaneous values, in each of the 1MG_CPU 410 and the 2MG_CPU 420. Then, the instantaneous values are multiplied by the respective distribution ratios k, 1−k, so that the output command values of the respective inverters are computed. In each of the 1MG_CPU 410, 2MG_CPU 420, the PWM signal production unit 260 performs PWM conversion, based on the input to which the output command value is added. Then, the MG1 inverter 14 and the MG2 inverter 24 are subjected to switching based on the PWM signals generated from the respective PWM signal production units 260, so that the generated voltage Vout is obtained. When a voltage deviation arises between the generated voltage target value and the detection value of the voltage sensor 90, due to variations in electric power consumed by the load, for example, the effective value PI control unit 65 adjusts the output voltage by varying the target voltage value according to the voltage deviation.

Figure 4:
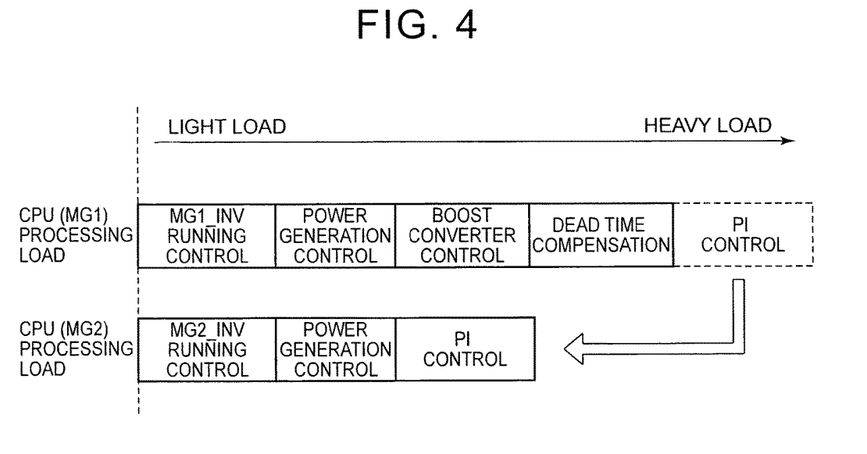
FIG. 4 is a view useful for explaining conditions of processing loads of 1MG_CPU and 2MG_CPU.

FIG. 4 is a view useful for explaining conditions of processing loads of the 1MG_CPU and the 2MG_CPU. Referring to FIG. 4, the 1MG_CPU 410 performs running control of the MG1 inverter 14, power generation control, boost converter control, and dead time compensation control.

In the block diagram of FIG. 1, the running control of the MG1 inverter 14 is mainly performed by the current command production unit 210, PI computing unit 240, coordinate conversion unit 250, and the PWM signal production unit 260. In the block diagram of FIG. 1, the power generation control is mainly performed by the neutral point output voltage command unit 70. In the block diagram of FIG. 1, the boost converter control is mainly performed by the boost command unit 30 and the PWM conversion unit 40. In the block diagram of FIG. 1, the dead time compensation control is mainly performed by the dead time compensation unit 91.

On the other hand, the 2MG_CPU 420 performs running control of the MG2 inverter 24, power generation control, and the PI control. In the 2MG_CPU 420 of the block diagram of FIG. 1, the running control of the MG2 inverter 24 is mainly performed by the current command production unit 210, PI computing unit 240, coordinate conversion unit 250, and the PWM signal production unit 260. In the 2MG_CPU 420 of the block diagram of FIG. 1, the power generation control is mainly performed by the neutral point output voltage command unit 70. In the 2MG_CPU 420 of the block diagram of FIG. 1, the PI control is performed by the effective value computing unit 63, and the effective value PI control unit 65.

As shown in FIG. 4, the 1MG_CPU 410 needs to do more processing than the 2MG_CPU 420, by the amounts of processing of the boost converter control and the dead time compensation control. Accordingly, if the 1MG_CPU 410 undertakes the processing of the PI control, the amounts of processing of the two CPUs are poorly balanced. Since the 1MG_CPU 410 and the 2MG_CPU 420 perform substantially the same processing for running control, it is preferable to use CPUs having the same performance as the 1MG_CPU 410 and the 2MG_CPU 420. Accordingly, it is preferable to cause the 2MG_CPU 420 to undertake the PI control, in order to uniformly distribute the processing at the time of neutral-point power generation. Since the processing load is uniformly distributed in this manner, the processing is stabilized even if the performance of the CPU is not excessively enhanced.

Next, a comparative example (in which voltage feedback control is performed for control of two inverters) and this embodiment (in which voltage feedback control is performed for control of one inverter) will be described through comparison of waveforms.

Figure 5:
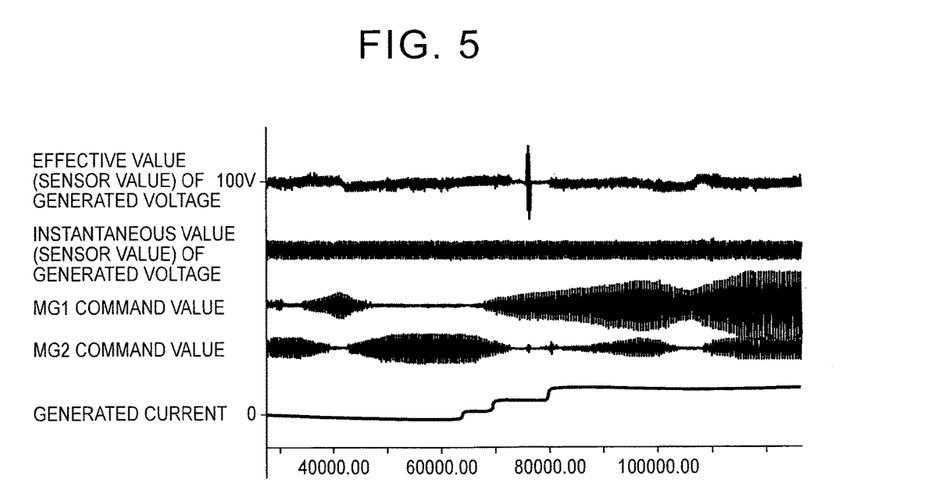
FIG. 5 is a waveform diagram useful for explaining voltage fluctuations in the comparative example in which voltage feedback control is performed in the inverters of the two motor-generators.
Figure 6:
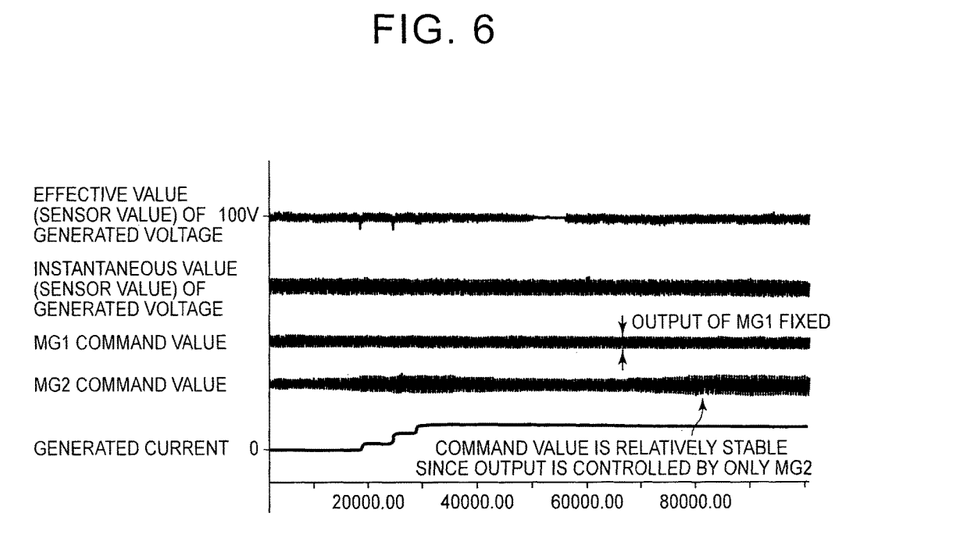
FIG. 6 is a waveform diagram useful for explaining voltage fluctuations in the power supply system of this embodiment.

FIG. 5 is a waveform diagram useful for explaining voltage fluctuations in the comparative example in which voltage feedback control is performed in inverters of two motor-generators. FIG. 6 is a waveform diagram useful for explaining voltage fluctuations in the power supply system of this embodiment.

In FIG. 5 and FIG. 6, the effective value of the generated voltage Vout (the effective value of the detection value of the voltage sensor 90), instantaneous value of the generated voltage (detection value of the voltage sensor 90), MG1 command value, MG2 command value, and generated current are indicated in the order of description as viewed from the top of the drawings. The generated current increases from zero when the load is turned ON, for example. The waveforms in FIG. 5 and FIG. 6 were obtained when the generated current increased from 0 to 12 A (the electric power increased from 0 to 1.2 kW) in the case where the generated voltage distribution rate k=50%, P=1.1 and I=0.3 (P represents a proportional term, and I represents an integral term) in the generated voltage effective value PI control unit.

In the waveform of FIG. 5, if the generated voltage effective value PI control is introduced into both the output voltage (command value) of MG1 and the output voltage (command value) of MG2, the output voltage (command value) of MG1 and the output voltage (command value) of MG2 are not stabilized, and the generated voltage effective value is also not stabilized, as is understood from FIG. 5.

On the other hand, in the waveform of FIG. 6, the generated voltage effective value PI control is introduced into only the output voltage of MG2; as a result, the output voltage (command value) of MG1 is fixed, and only the output voltage (command value) of MG2 varies for the purpose of power control. However, the output voltage (command value) of MG2 shown in FIG. 6 is relatively stable as compared with the output voltage of MG2 shown in FIG. 5. It is also understood from FIG. 6 that the generated voltage effective value is free from oscillation, for example, and is thus stabilized.

Finally, this embodiment will be summarized with reference to the drawings. Referring to FIG. 1, the power supply system of this embodiment includes the MG1 inverter 14, the motor-generator MG1 driven by the MG1 inverter 14, a first controller (1MG_CPU 410) that controls the MG1 inverter 14, the MG2 inverter 24, the motor-generator MG2 driven by the MG2 inverter 24, and a second controller (2MG_CPU 420) that controls the MG2 inverter 24. The power supply system further includes the pair of output terminals 60a, 60b of which one terminal is connected to the neutral point N1 of the stator coils of the motor-generator MG1, and the other terminal is connected to the neutral point N2 of the stator coils of the motor-generator MG2, and the voltage sensor 90 that detects the voltage Vout generated from the pair of output terminals 60a, 60b. The second controller controls the MG2 inverter 24, according to a deviation between a target value of the voltage generated from the output terminals, and the voltage detected by the voltage sensor 90. This processing is implemented by the effective value computing unit 63, effective value PI control unit 65, and the neutral point output voltage command unit 70. The first controller controls the MG1 inverter 14 according to the target value of the voltage generated from the output terminals (the command value Vsr outputted by the neutral point output voltage command unit 70), irrespective of the magnitude of the deviation.

Since the voltage feedback control is performed in only one of the controllers, interference of the feedback control between the two controllers and occurrence of hunting, which would occur if voltage feedback control is performed in both of the controllers, are suppressed or prevented.

Preferably, the power supply system is installed on the vehicle 100, and further includes the drive wheels 6, and the engine 2. The motor-generator MG1 operates as a generator when it receives mechanical power of the engine 2 and generates electric power. The motor-generator MG2 operates as a motor for driving the drive wheels 6 so as to travel the vehicle. When the motor-generator MG1 is driven as a generator when electric power is supplied from the pair of output terminals 601, 60b to the load, the first controller further executes dead time compensation control of the MG1 inverter 14. This control is implemented by the dead time compensation unit 91.

The first and second controllers share control so that the first controller performs the dead time compensation control, and the second controller performs the voltage feedback control. Thus, as explained above with reference to FIG. 4, it is possible to reduce a difference in the processing load between the first controller and the second controller.

More preferably, each of the first controller and the second controller is comprised of a computer having substantially the same performance. Namely, the 1MG_CPU 410 and the 2MG_CPU 420 may be constituted by CPUs having substantially the same performance.

In this embodiment, the difference in the processing load between the first controller and the second controller is reduced. Accordingly, stable processing can be achieved even if a computer having excessively high performance is not used.

It is to be understood that the embodiment disclosed herein is not restrictive but exemplary in all respects. The scope of this invention is not specified by the above description of the embodiment but defined by the appended claims, and is intended to include all changes within the range of the appended claims and equivalents thereof.

What is claimed is:

1. A power supply system comprising:
   a first inverter;
   a first motor-generator driven by the first inverter;
   a second inverter;
   a second motor-generator driven by the second inverter;
   a pair of output terminals including a first terminal connected to a neutral point of stator coils of the first motor-generator, and a second terminal connected to a neutral point of stator coils of the second motor-generator;
   a voltage detector that detects a voltage generated from the pair of output terminals;
   a first controller configured to control the first inverter according to a target value of the voltage generated from the output terminals, irrespective of a magnitude of a deviation between the target value of the voltage generated from the output terminals, and the voltage detected by the voltage detector; and
   a second controller configured to control the second inverter according to the deviation to reduce the deviation between the same target value according to which the first inverter is controlled and the voltage detected by the voltage detector.

2. The power supply system according to claim 1, wherein
   the power supply system is installed on a vehicle;
   the vehicle includes drive wheels, and an internal combustion engine;
   the first motor-generator is configured to receive mechanical power of the internal combustion engine and generate electric power;
   the second motor-generator is configured to drive the drive wheels; and
   the first controller is configured to execute dead time compensation control of the first inverter, when the first motor-generator generates electric power while electric power is supplied from the pair of output terminals to a load.

3. The power supply system according to claim 2, wherein each of the first controller and the second controller comprises a computer having substantially the same performance.

* * * * *